United States Patent [19]

Cunningham

[11] 3,906,704
[45] Sept. 23, 1975

[54] APPARATUS FOR ASSEMBLING CARRIERS TO CONTAINERS

[75] Inventor: Ernest Ray Cunningham, Libertyville, Ill.

[73] Assignee: Grip-Pak, Inc., St. Louis, Mo.

[22] Filed: Oct. 15, 1973

[21] Appl. No.: 406,433

[52] U.S. Cl. .................................. 53/48; 53/198 R
[51] Int. Cl. ........................................... B65b 21/02
[58] Field of Search .............. 53/3, 26, 35, 48, 134, 53/152, 196, 198, 200

[56] References Cited
UNITED STATES PATENTS

| | | | |
|---|---|---|---|
| 2,864,212 | 12/1958 | Bruce | 53/48 X |
| 2,929,181 | 3/1960 | Poupitch | 53/35 |
| 3,383,828 | 5/1968 | Cunningham | 53/35 |
| 3,404,505 | 10/1968 | Hohl | 53/35 X |
| 3,447,280 | 6/1969 | Cunningham | 53/48 |
| 3,628,305 | 12/1971 | Owen | 53/35 |
| 3,714,756 | 2/1973 | MacInnes | 53/48 |
| 3,742,677 | 7/1973 | Best | 53/35 X |

Primary Examiner—Travis S. McGehee
Assistant Examiner—John Sipos
Attorney, Agent, or Firm—Michael Kovac

[57] ABSTRACT

Apparatus and method are disclosed for feeding and applying an interconnected series of plastic carrier devices to containers at a predetermined faster speed than the movement of the containers along a linear path.

5 Claims, 4 Drawing Figures 3,906,704

APPARATUS FOR ASSEMBLING CARRIERS TO CONTAINERS

SUMMARY OF THE INVENTION

There are several machines and methods for applying plastic carrier devices to containers. Vertical assembly of carriers and containers relative to each other is shown in U.S. Pat. No. 2,929,181. Application of plastic carrier devices to continers by a rotary carrier applicator drum is disclosed in U.S. Pat. Nos. 3,032,943 and 3,032,944. Another assembly technique includes the use of carrier applicating elements moving in an endless oblong path as is shown in U.S. Pat. No. 3,383,828.

All of the above assembly techniques include the stretching of constrictive apertures of plastic carrier devices during assembly thereof to containers. It will be appreciated that continuous assembly techniques, including the use of a rotary carrier applicator drum and carrier applicating elements moving in an endless oblong path, are desired because plastic carrier devices can be continuously assembled to containers while moving in a horizontal path. The present invention discloses an assembly technique which is not only a continuous-in-line process, but is also a linear assembly technique in which carriers are fed and assembled to containers in a linear path at a predetermined faster speed than the movement of the containers in the linear path.

Speed, efficiency of operation and cost are important factors in determining machine reliability and performance. This is true of plastic carrier applicating techniques as well. As will be apparent from the discussion that is to follow, the herein disclosed apparatus and method for assembling plastic carrier devices to containers achieves each of the aforementioned objects in a manner not previously obtainable by prior art techniques.

Accordingly, it is an object of the present invention to provide a new, continuous-in-line apparatus and method for assembling plastic carrier devices to containers.

More specifically, it is an object of the present invention to provide a plastic carrier assembly technique which includes high speed and efficiency as well as low manufacturing and operating costs.

These and other objects and advantages of the present invention are attained by the provision of a method of apparatus for assembling an interconnected series of plastic carrier devices to containers including means for or the steps of moving a plurality of containers at a predetermined speed in a linear path and feeding and applying the interconnected series of plastic carrier devices to containers in the linear path at a predetermined faster speed that the movement of the containers.

DESCRIPTION OF THE PREFERRED EMBODIMENTS

Figure 1:
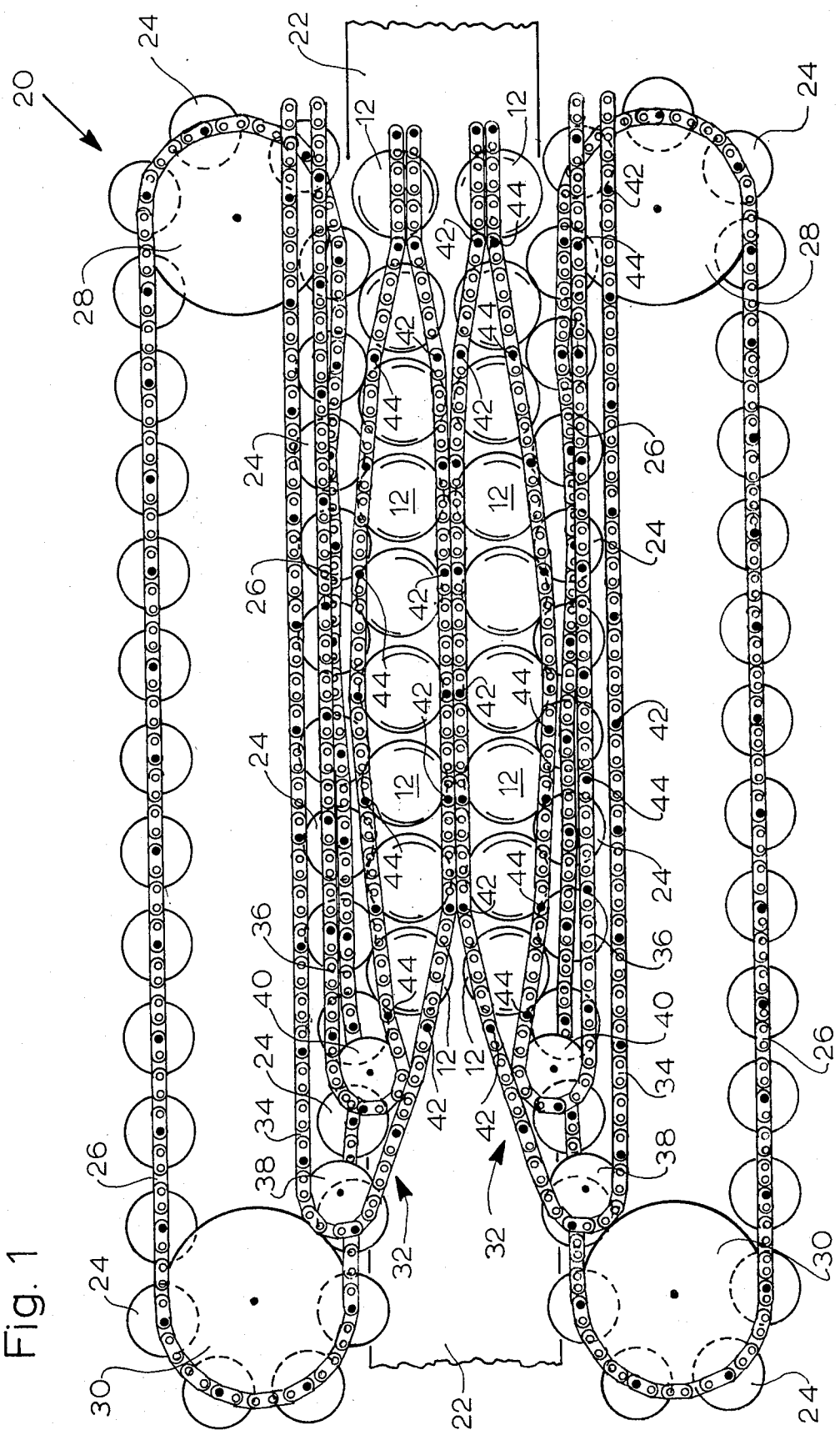
FIG. 1 is a fragmentary top plan view of a carrier applicating machine embodying the features of the present invention.

While the apparatus and method of the present invention can assemble various types of plastic carrier devices to containers, one preferred type of plastic carrier device which can be assembled to containers is shown in U.S. Pat. No. 3,785,484. In the drawings, plastic carrier devices of the aforementioned patent are shown as being assembled to containers.

Figure 4:
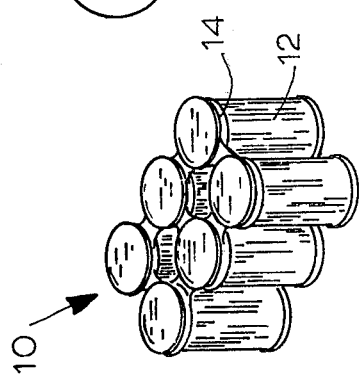
FIG. 4 is a perspective view of the container package which can be produced by practicing the method and apparatus of the present invention.

In FIG. 4 of the drawings, the container package 10 that is desired to be produced by the herein disclosed apparatus and method includes a plurality of containers 12 arranged into 2 rows of 3 containers each to form the well-known six-pack configuration. Each of the containers 12 are gripped adjacent to the upper end thereof by a plastic carrier device 14 which has been stretched into elastic gripping engagement relative to containers by the herein disclosed apparatus and method.

Prior to assembly to containers, the carrier are joined to one another as an interconnected strip of carriers to take advantage of manufacturing and shipping economies to customers. In addition, the interconnected strip of carriers permits adjacent carriers in the strip to feed one another during the assembly operation as will be apparent.

Figure 2:
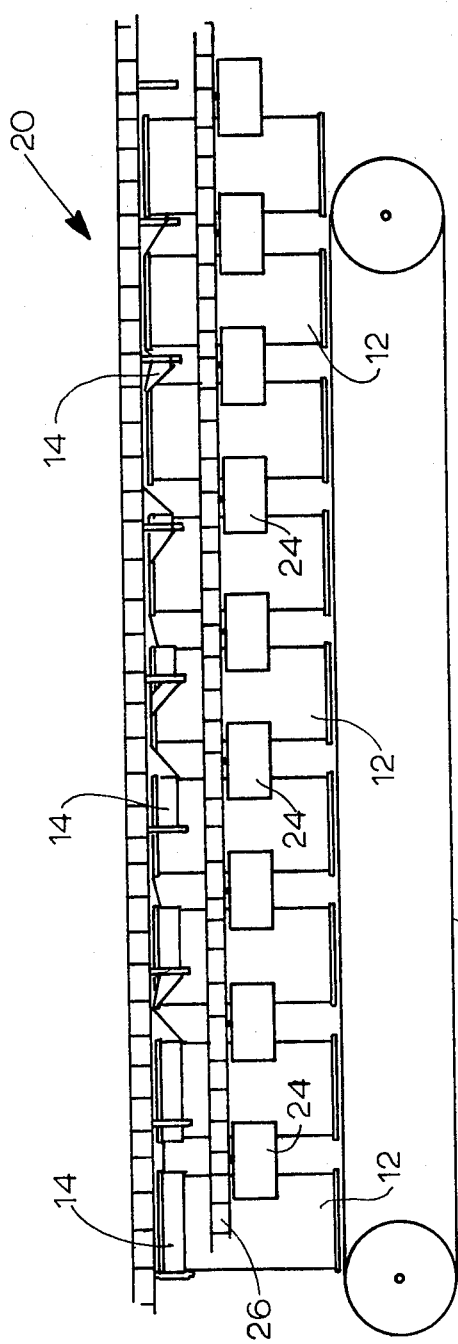
FIG. 2 is a fragmentary side elevational view of the container feeding and carrier applicating portions of the machine illustrated in FIG. 1.

Referring now to FIGS. 1–2 of the drawings, there is shown a machine 20 for assembling carriers 14 to containers 12. The machine 20 includes an endless conveyor belt 22 for moving a procession of containers 12 at a predetermined speed in a horizontal or liner path. The containers 12 are received by he conveyor means 22 at the righthand side of machine 20 as viewed in FIGS. 1–2 of the drawings and are moved through the machine from the right to the left-hand side thereof as depicted in FIGS. 1–2. Sprocket mechanisms such as shown in my aforementioned U.S. Pat. No. 3,383,828 are used to guide and maintain the conveyor means 22 in its path.

The containers 12 are moved in a double-file procession through the machine 20 and are equidistantly spaced from one another in the horizontal path by a plurality of horizontally moving free spinning rollers 24 which are mounted to the endless chains 26 positioned on each side of the conveyor belt 22. The chains 26 are driven by the spaced sprockets 28, 30 at the right and left-hand side of the machine 20 as viewed in FIG. 1 of the drawings. Each of the horizontally moving freespinning rollers 22 are spaced from one another and moved in synchronous relation to the double file procession of containers 12 in order to engage adjacent containers 12 in the horizontal or linear path for spacing the containers 12 an equal distance from each other. The proper spacing and speed of the double-file procession of containers 12 through the machine 20 is important in the proper and repetitive assembly of carriers 14 to containers 12.

It will be noted, in comparing FIGS. 1–2 of the drawings, that the free-spinning rollers 24 are arranged to engage at outer sidewall surfaces of adjacent containers 12 in approximately the mid portions of the containers so as to avoid any interference with the conveyor belt 22 and the carrier feeding and applying mechanisms now to be described.

As best seen in FIG. 1 of the drawings, there is provided a carrier feeding and applying mechanism generally designated by the numeral 32 for each row of containers 12. In order to avoid repetition of description, reference will be made to one of the carrier feeding and applying mechanisms 32 with the understanding that a pair of such mechanisms 32 are required for the double-file procession of containers 12.

Each of the carrier feeding and applying mechanisms 32 include a pair of horizontally moving chain elements 34, 36 which are mounted for movement in a closed path in the vacinity of the upper end of one row of containers 12. The chain element 36 is mounted for movement in its closed path totally within the confines of the path of movement of the chain element 34. This makes it possible for the chain elements 34, 36 to cooperate with one another in feeding and applying carriers 14 to the containers 12.

Each of the chain elements 34, 36 are driven by sprocket elements 38, 40 respectively which are shown at the left-hand side of FIG. 1 of the drawings. It will be appreciated that companion sprockets (not shown) will be used at the other end of the closed path of movement of the chain element 34, 36. Each of the sprockets 38, 40 at the left-hand side of the closed path and the sprockets (not shown) at the right-hand side of the closed path are driven in synchronous and similar speed relationship to one another in order that the chain elements 36, 38 are driven at the same speed. The chain elements 36, 38 are; however, operated at a predetermined faster speed than the conveyor means 22 which moves the containers 12 at a predetermined speed through the machine 20.

Each of the chain elements 34, 36 have a plurality of spaced pin elements 42, 44 respectively which extend downwardly from the chain elements 34, 36. The arrangement of the chain elements 34, 36 in their closed paths of movement enables a plurality of pairs of pin elements 42, 44 of the chain elements 34, 36 respectively to cooperate with one another in feeding and applying carriers 14 to the containers 12. This can best be seen by comparing the machanical arrangement of FIG. 1 of the drawings with the schematic illustration of FIG. 3 of the drawings.

Figure 3:
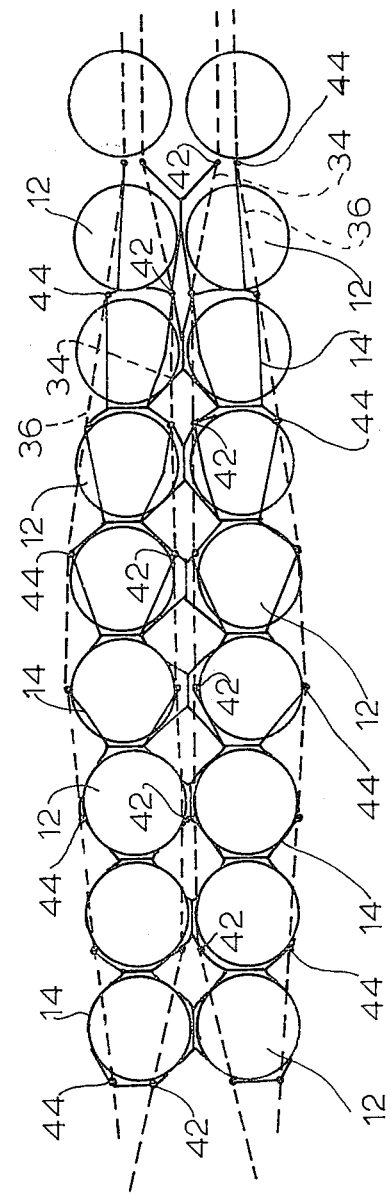
FIG. 3 is a schematic view illustrating the assembly of an interconnected strip of carrier devices to containers.

The dotted lines shown in FIG. 3 of the drawings represent the movement of the chain elements 34, 36 respectively in the horizontal or linear path of movement of the containers 12 as they are conveyed by the conveyor belt 22 and equidistantly spaced from one another by the free spinning rollers 24. As can be seen, the plurality of cooperating pairs of pin elements 42, 44 of the chain element 34, 36 respectively are mounted for movement in diverging relationship to each other for a predetermined portion of the horizontal or linear path and then are mounted for movement in converging relationship to each other for another predetermined portion of the horizontal or linear path. The diverging and converging paths of the plurality of cooperating pairs of pin elements 42, 44 permits the pin elements to be inserted into the apertures of the interconnected series of plastic carrier devices 14 for feeding and applying the carrier 14 relative to the container 12.

The manner in which the pin elements are inserted into the apertures of the plastic carrier devices 14 and then moved relative to the containers 12 for assembling the plastic carrier devices thereto is best illustrated by comparing FIGS. 2 and 3 of the drawings. In FIG. 2 of the drawings, the pin elements 44 are shown as being inserted into the apertures of the plastic carrier devices 14 and then moved in a path around the containers 12 for assembly of the plastic carrier devices 14 to the upper ends of the containers 12.

It will be appreciated that the plurality of pairs of pin elements 42, 44 are positioned to extend below the upper ends of the containers 12 as seen in FIG. 2 of the drawings for the purpose of assembling the plastic carrier devices 14 to the containers 12. Vertical displacement or assembly of the carrier devices 14 relative to the containers 12 occurs by the stretching of the carrier devices 14 by the pin elements 42, 44 from a horizontal to a generally vertically directed position as is best seen in Fig. 2 of the drawings. In the movement of the plurality of pairs of pin elements 42, 44 in the diverging and converging paths of movement through the horizontal or linear path of container movement, the pair of cooperating pin elements 42, 44 will transcribe an arc of approximately 180° around the containers 12. This is best seen in FIG. 3 of the drawings where the cooperating pairs of pin elements 42, 44 are shown in close proximity to one another at the right-hand side of the figure and then are shown in close proximity to one another at the left-hand side of the figure. Between the right-hand and left-hand sides of the figure, the plurality of pairs of pin elements are moved in diverging relationship to one another for a predetermined portion of the horizontal or linear path and then in converging relationship for the remaining portion of the horizontal or linear path.

In order that the plastic carrier devices 14 can be stretched and applied over the upper ends of containers 12 as they move in the horizontal or linear path through the machine 20, it is important that the chain elements 34, 36 are driven in synchronous relationship to one another, but at a predetermined faster speed than the movement of the containers 12 in order that the cooperating pairs of pin elements 42, 44 of the chain elements 34, 36 respectively can move in the above described fashion for assembling the plastic carrier device 14 to the containers 12. This is easily accomplished by overrunning the chain elements 34, 36 relative to the conveyor means 22 run by suitable drive mechanisms (not shown).

From the foregoing, it will not be appreciated that the apparatus and method of assembling plastic carrier devices to containers utilizes entirely different mechanisms and prodedural steps from those of the prior art. The speed, efficiency and cost of such carrier applicating techniques is also greatly enhanced over the prior art by the present invention.

I claim:

1. Apparatus for assembling an interconnected series of plastic carrier devices to containers, comprising: conveyor means for moving at least one row of containers at a predetermined speed in a horizontal path, and a pair of horizontally moving carrier feeding and applying mechanisms for each row of containers, each said pair of carrier feeding and applying mechanisms being operated at a predetermined faster speed than said containers for applying said carriers to said containers in said horizontal path.

2. The apparatus as defined in claim 1 and including means for equidistantly spacing said containers in said horizontal path, said last mentioined means including a plurality of horizontally moving free spinning rollers each of which engage adjacent containers moving in said horizontal path to space said containers an equal distance from each other.

3. The apparatus as defined in claim 1 wherein each said pair of horizontally moving carrier feeding and applying mechanisms include a plurality of pairs of pin elements, each said pair of pin elements being mounted for movement in diverging relationship to each other for a predetermined portion of the horizontal path and also being mounted for movement in converging relationsip to each other for another predetermined portion of the horizontal path in order to assembly said carrier devices to containers.

4. The apparatus as defined in claim 1 wherein each pair of horizontally moving carrier feeding and applying mechanisms are mounted for movement in a closed path, one mechanisms of each pair being mounted for movement in a path totally contained within the path of movement of said other mechanism.

5. Apparatus for assembling an interconnected series of plastic carrier devices to containers, comprising: means for moving a plurality of containers in a linear path at a predetermined speed, means for feeding the interconnected series of plastic carrier devices in adjacent relation to one end of said containers, and means for progressively assembling the interconnected series of plastic carriers to said containers in said linear path, said means for feeding and said means for progressively assembling carriers to containers being operated at a predetermined faster speed in said linear path than said containers.

* * * * *